United States Patent [19]

Komatsu

[11] Patent Number: 4,696,198

[45] Date of Patent: Sep. 29, 1987

[54] POWER ASSIST DEVICE FOR AUTOMOTIVE STEERING SYSTEM

[75] Inventor: Shinichi Komatsu, Hatano, Japan

[73] Assignee: Atsugi Motor Parts Company, Limited, Kanagawa, Japan

[21] Appl. No.: 782,135

[22] Filed: Sep. 30, 1985

[30] Foreign Application Priority Data

Oct. 22, 1984 [JP] Japan .............................. 59-221544

[51] Int. Cl.⁴ .............................................. F15B 9/10
[52] U.S. Cl. .................. 74/388 PS; 180/132; 137/596; 91/370
[58] Field of Search ................. 60/385, 387; 137/596; 180/148, 132; 91/370, 375 R, 465; 74/388 PS

[56] References Cited

U.S. PATENT DOCUMENTS

| | | |
|---|---|---|
| 3,978,770 | 9/1976 | Strauff .............................. 91/375 R |
| 4,344,284 | 8/1982 | Lang .................................. 180/132 X |

FOREIGN PATENT DOCUMENTS

| | | | |
|---|---|---|---|
| 1233738 | 2/1967 | Fed. Rep. of Germany ...... | 180/132 |
| 2417194 | 11/1975 | Fed. Rep. of Germany ...... | 180/132 |
| 3122369 | 12/1982 | Fed. Rep. of Germany ...... | 180/132 |
| 3248251 | 7/1984 | Fed. Rep. of Germany ...... | 180/132 |

Primary Examiner—Cornelius J. Husar
Assistant Examiner—Joseph A. Fischetti
Attorney, Agent, or Firm—Bachman & LaPointe

[57] ABSTRACT

A power-assist device for an automotive steering system employs spool valves of substantially identical construction and identical size to control the fluid pressure in smaller and larger area chambers of an unbalanced cylinder. For compensating difference of effective area between smaller and larger area chambers, the position of bores defned in a housing of a pressure control valve for receiving the spool valves are differed from each other so that the spool valve opening and closing an induction path for the smaller area chamber and opening closing a drain path for the larger area chamber moves at greater magnitude than that of the other spool valve which opens and closes an induction path for the larger area chamber and opens and closes an exhaust path for the smaller area chamber. By this valve arrangement, a wider path area is provided for introducing a larger amount of working fluid into the smaller area chamber in comparison with that into the larger area chamber and a narrower path area is provided for draining the smaller amount of working fluid in the smaller area chamber than that for the larger area chamber. By utilizing spool valves of identical constructions, mis-assembling can be completely avoided. This requires substantially lesser attention that that conventionally required. In addition, by applying the identical spool valves, manufacturing cost of the spool valves can be lowered at a significant level.

11 Claims, 2 Drawing Figures

POWER ASSIST DEVICE FOR AUTOMOTIVE STEERING SYSTEM

BACKGROUND OF THE INVENTION

The present invention relates generally to a power-assist device for an automotive steering system. More specifically, the invention relates to a power-assist device employing a spool valve-type pressure control valve.

Hydraulic power-assist devices employing unbalanced cylinder devices have been known to be of simple structure and low in cost. In such hydraulic power-assist devices, a piston firmly mounted on a piston rod is inserted into a hollow cylinder. The piston defines two pressure chambers within the hollow cylinder. The piston rod extends through one of the two pressure chambers, resulting in a difference between the effective areas of the piston subject to fluid pressure in the two pressure chambers. In particular, the pressure chamber receiving the piston rod will have a smaller effective area than the other chamber. The former pressure chamber will be referred to hereafter as "smaller area chamber" and the latter chamber will be referred to hereafter as "larger area chamber".

Due to this difference in the effective areas, when fluid pressure is applied equally to the smaller and larger area chambers, the hydraulic forces applied to the two sides of the piston to assist steering differ. As a result, the piston is displaced into the smaller area chamber until the forces applied to either side of the piston balance.

There are various approaches to solving this problem of the unbalanced cylinder device. One typical approach is disclosed in German Patent First Publication No. 29 31 139, published on Feb. 5, 1981. The disclosed device uses a pressure control valve employing spool valves to adjust the supply of working fluid to the smaller and larger diameter chambers. In the shown device, a spool valve controlling the supply of working fluid to the smaller area chamber has a relatively wide annular groove for relatively small throttling resistance to fluid flow. On the other hand, the other spool valve controlling the supply of working fluid to the larger area chamber has a relatively narrow annular groove applying a greater throttling resistance to fluid flow. Thus, the increasing rate of fluid pressure into the smaller area chamber is greater than that into the larger area chamber so that a higher fluid pressure is built up in the smaller diameter chamber. This pressure difference balances the forces exerted on both sides of the piston so as to eliminate any bias relative to the neutral position thereof of the steering wheel. This balance also balances the steering load both steering directions to ensure a good operating feeling.

However, this conventional pressure control device tends to be mis-assembled due to the fact that the spool valves have essentially the same external diameter. Since the two spool valves have the same external diameter and are of generally the same size and shape except for the width of the groove, workers installing the spool valves in valve housings must pay careful attention to avoid mis-assembly. This obviously lowers efficiency. Furthermore, some instances of misassembly are inevitable. When the spool valves are installed in the valve housing backwards, the piston will generate a strong steering bias and so subject the vehicle occupants to serious danger.

SUMMARY OF THE INVENTION

Therefore, it is an object of the invention to provide a power-assist device for a vehicular steering system, which does not require much attention during assembling and thus makes assembly easier.

Another object of the invention is to provide a power-assist device for a vehicular steering system which can help make the overall steering system compact and light-weight.

In order to accomplish the aforementioned and other objects, a power-assist device for an automotive steering system according to the present invention employs spool valves of substantially indentical construction and identical size to control the fluid pressure in smaller and larger area chambers of an unbalanced cylinder. For compensating difference of effective area between smaller and larger area chambers, position of bores defined in a housing of a pressure control valve for receiving the spool valves are differed from each other so that the spool valve opening and closing an induction path for the smaller area chamber and opening closing a drain path for the larger area chamber moves at greater magnitude than that of the other spool valve which opens and closes an induction path for the larger area chamber and opens and closes an exhaust path for the smaller area chamber.

By this valve arrangement, a wider path area is provided for introducing a larger amount of working fluid into the smaller area chamber in comparison with that into the larger area chamber and a narrower path area is provided for draining the smaller amount of working fluid in the smaller area chamber than that for the larger area chamber.

By utilizing spool valves of identical constructions, mis-assembling can be completely avoided. This requires substantially lesser attention that that conventionally required. In addition, by applying the identical spool valves, the manufacturing cost of the spool valves can be lowered at a significant level.

According to one aspect of the invention, an automotive steering system having an unbalanced cylinder and a fluid control valve disposed in a hydraulic circuit connecting the cylinder to a fluid pressure source and to a fluid reservoir for controlling supply and drain of working fluid to the cylinder, comprises the unbalanced cylinder having:
  an enclosed hollow cylinder;
  a piston disposed within the internal space of the cylinder so as to divide same into first and second working chambers; and
  a piston rod connected to the piston at one end and connected at the other end to a steering member which actuates re-alignment of vehicular wheels for steering, the piston rod extending through the first chamber and exiting the cylinder for connection to the steering member at the other end; and
the fluid control valve having:
  a valve housing connected to a manually operable steering stub shaft by means of a yielding structural member;
  a first and a second bore passing through the valve housing, which first and second bores are radially located at different positions relative to the steering stub shaft;

a first and second spool valve disposed reciprocably within the first and second bore respectively, the first and second spool valves being connected to the steering stub shaft so as to be driven reciprocably in response to relative displacement between the valve housing and the steering stub shaft due to yielding of the yielding member, and the first and second spool valves having the same structure, and the first and second spool valves are so associated with the first and second bores as to differentiate magnitude of shifting relative to the first and second bores from each other;

first and second means defining a first supply orifice and a first drain orifice between the first spool valve and the inner periphery of the first bore, the flow cross-section of the first supply orifice varying with the position of the first spool valve for control of the supply of working fluid to the first working chamber in the cylinder, and the flow cross-section of the first drain orifice varying with the position of the first spool valve for control of drainage of working fluid from the second working chamber, and a second supply orifice and a second drain orifice between the second spool valve and the inner periphery of the second bore, the flow cross-section of the second supply orifice varying with the position of the second spool valve for control of the working fluid supply to the second working chamber of the cylinder, and the flow cross-section of the second drain orifice varying with the position of the second spool valve for control of drainage of working fluid from the first chamber of the cylinder, and the flow cross-section of the first supply orifice and the first drain orifice being greater than that of the corresponding second supply orifice and second drain orifice.

The difference of shifting magnitude of the first and second spool valve is determined so as to compensate flow path difference between the first supply orifice and the second supply orifice and between the first drain orifice and the second drain orifice.

The first means comprises first and second lands on the spool valve and third and fourth lands on the inner periphery of the first bore, the first land opposing the third land so as to define the first supply orifice therebetween and the second land opposing the fourth land so as to define therebetween the first drain orifice, and the second means comprises fifth and sixth lands on the second spool valve and seventh and eighth lands on the inner periphery of the second bore, the fifth land opposing the seventh land so as to define the second supply orifice therebetween and the sixth land opposing the eighth land so as to define the second drain orifice therebetween. The flow cross-sections of the first supply orifice and the first drain orifice are larger than those of the second supply orifice and the second drain orifice to such an extent that the increase in fluid flow rate through the first supply orifice to the first bore relative to that through the second supply control section to the second working chamber, and the decrease in fluid flow rate though the second drain orifice from the first chamber relative to that through the first drain orifice from the second working chamber compensates for the difference between the effective areas of the first and second working chambers due to the presence of the piston rod.

The third and fourth lands are larger in diameter than the first and second lands so as to define the first supply orifice and the first drain orifice, and the seventh and eighth lands are larger in diameter than the fifth and sixth lands so as to define the second supply orifice and the second drain orifice, the third and foruth lands being of greater diameter than the seventh and eighth lands.

According to another aspect of the invention, a fluid flow control valve device for a power assist system for an automotive vehicle which has a hydraulically actuated unbalanced cylinder enclosing a piston connected to a steering member which actuates re-alignment of vehicular wheels for steering, which piston divides the internal space of the cylinder into first and second working chambers, comprises a valve housing connected to a manually operable steering stub shaft by means of a yielding structural member, a first and a second bore passing through the valve housing, which first and second bores are radially loacated at different positions relative to the steering stub shaft, a first and second spool valve disposed reciprocably within the first and second bore respectively, the first and second spool valves being connected to the steering stub shaft so as to be driven reciprocably in response to relative displacement between the valve housing and the steering stub shaft due to yielding of the yielding member, and the first and second spool valves having the same structure, and the first and second spool valves are so associated with the first and second bores as to differentiate magnitude of shifting relative to the first and second bores from each other, and first and second means defining a first supply orifice and a first drain orifice between the first spool valve and the inner periphery of the first bore, the flow cross-section of the first supply orifice varying with the position of the first spool valve for control of the supply of working fluid to the first working chamber in the cylinder, and the flow cross-section of the first drain orifice varying with the position of the first spool valve for control of drainage of working fluid from the second working chamber, and a second supply orifice and a second drain orifice between the second spool valve and the inner periphery of the second bore, the flow cross-section of the second supply orifice varying with the position of the second spool valve for control of the working fluid supply to the second working chamber of the cylinder, and the flow cross-section of the second drain orifice varying with the position of the second spool valve for control of drainage of working fluid from the first chamber of the cylinder, and the flow cross-section of the first supply orifice and the first drain orifice being greater than that of the corresponding second supply orifice and second drain orifice.

According to a further aspect of the invention, an automotive steering system with a hydraulic power assist device comprises a steering member connected to vehicular wheels for adjusting the orientation of the wheels for steering and transversely movable according to manual steering adjustments, a hollow hydraulic cylinder having first and second inlet ports and first and second drain ports, a piston disposed within the hydraulic cylinder and dividing the internal space of the cylinder into first and second chambers, the first chamber being in communication with the first inlet port and the first drain port, and the second chamber being in communication with the second inlet port and the second drain port, the piston being connected to the steering member for transverse movement therewith via a piston rod extending through the first chamber, a power-assist valve housing with a third inlet port connected to a working fluid source, first and second outlet ports respectively connected to the first and second inlet ports of the cylinder, and third and fourth drain ports respectively connected to the first and second drain ports of the cylinder and fifth drain port connected to a fluid reservoir for returning working fluid thereto, the housing also having first and second bores passing therethrough, the first bore being in communication with the first outlet port and the fourth drain port and the second bore being in communication with the second outlet port and the third drain port, the first and second bore being located in radially different positions to each other with respect to the center axis extending in a direction perpendicular to the direction toward which the first and second bores extend, and first and second spool valves respectively disposed within the first and second bores and associated with a steering shaft rotatable manually in opposite directions, the first and second spool valves being of identical construction, the first and second valves being associated with an actuation means extending along the center axis of the valve housing to be transmitted steering force for causing shifting relative to corresponding one of first and second bores during steering operation, the first spool valve defining a first variable supply control path in conjunction with the inner periphery of the first bore establishing fluid communication between the third inlet port and the first outlet port, and a variable first drain control path in conjunction with the inner periphery of the first bore establishing fluid communication between the fifth drain port and the fourth drain port, and the second spool valve defining in conjunction with the inner periphery of the second bore a second supply control path establishing fluid communication between the third inlet port and the second outlet port and a second drain path establishing fluid communication between the fifth drain port and the third drain port, the second control paths having smaller flow cross-section than the first control paths, the flow cross-sections of all of the control paths varying with rotation of the steering shaft.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment of the invention but are for explanation and understanding only.

In the drawings.

DESCRIPTION OF THE PREFERRED EMBODIMENT

Figure 1:
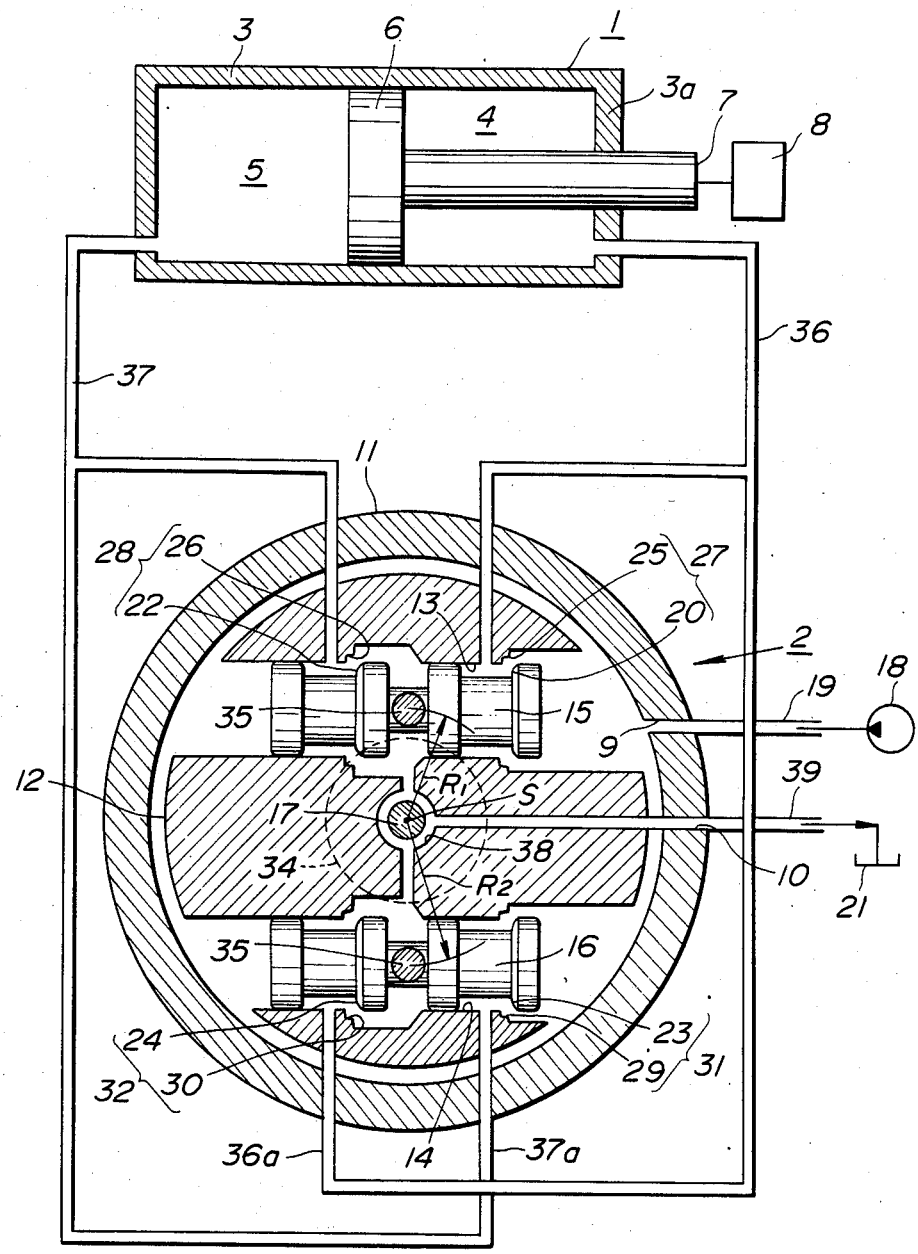
FIG. 1 is a diagram of the preferred embodiment of a power-assist device for an automotive steering system, according to the present invention.
Figure 2:
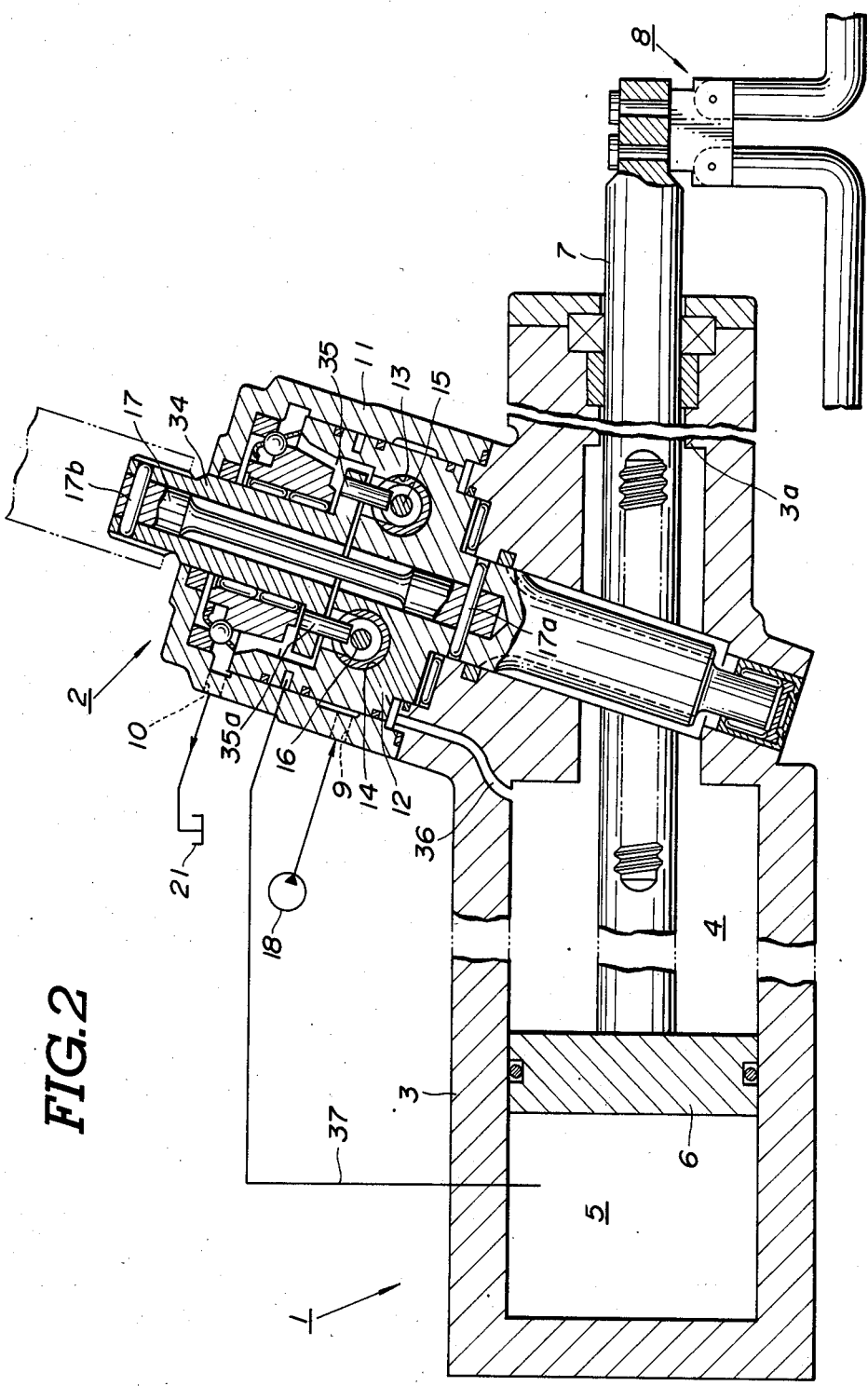
FIG. 2 is a section through the pressure control device used in the preferred embodiment of the power-assist device of FIG. 1.

Referring now to the drawings, particularly to FIGS. 1 and 2, the preferred embodiment of a power-assist device according to the present invention generally comprises an unbalanced cylinder device 1 and a hydraulic pressure control device 2.

The unbalanced cylinder device 1 has an enclosed hollow cylinder 3. A piston 6 is slidingly disposed within the internal space of the cylinder 3 and defines therein a smaller area chamber 4 and a larger area chamber 5. The piston 6 is fixedly mounted to one end of a piston rod 7. The piston rod 7 extends through the smaller area chamber 4 from the cylinder 1 through an opening in a cylinder end wall 3a. The opening in the cylinder wall 3a for the piston rod 7 is sealed fluid-tight. The outer end of the piston rod 7 is connected to a steering member 8, i.e. a tie-rod, so as to transmit steering force of the piston 6 to the steering member.

The hydraulic pressure control valve 2 is disposed within a hydraulic circuit connecting a working fluid source 18, which comprises a fluid pump, and the unbalanced cylinder device 1. The hydraulic pressure control device 2 has a housing 11. The housing 11 has an inlet port 9 and a drain port 10. A valve body 12 is disposed within the housing 11. As shown in FIG. 2, the valve body 12 is connected to the steering member 8 through the piston rod 7. In the shown embodiment, the interconnection between the piston rod 7 and the lower end of the valve body 12 constitutes a well-known rack-and-pinion steering mechanism.

The valve body 12 is also connected to a steering stub shaft 34 by means of a torsion bar 17. Each end of the torison bar 17 is fixed to the valve body 12 and the steering stub shaft 34 by means of connector pins 17a and 17b. First and second bores 13 and 14 pass through the valve body 12 perpendicular to and to either side of the torsion bar 17 which lies essentially parallel to the axis of the valve body. First and second spool valves 15 and 16 are accommodated within the first and second bores 13 and 14 so as to be free to reciprocate along the axes of the first and second bores. The first and second spool valves 15 and 16 are both connected to the steering stub shaft 34 by means of finger pins 35 fixed to the steering stub shaft at one end.

As will be appreciated from FIG. 1, the first second spool valves 15 and 16 are formed in identical construction and identical size. For instance, in production of these first and second valves 15 and 16, they are produced in substantially identical procedure and identical process in a production line producing only one construction and only one size of spool valves regardless of whether they are used as the first spool valve or the second spool valve. On the other hand, the first and second bores 13 and 14 have substantially identical profile and identical size. The first and second bores are radially located at different positions relative to each other. Therefore, the first and second spool valves 15 and 16 are positioned at radially different positions with respect to the torsion bar 17. This arrangement varies radius $R_1$ and $R_2$ of the first and spool valves about the center axis of the torsion bar 17. In the shown embodiment, the first bore 13 is located nearer to the center of the torsion bar 17 in comparision with that second bore 14. Therefore, the radius $R_1$ of the first spool valve 15 is smaller than the radius $R_2$ of the second spool valve 16.

When the valve body 12 receives a steering counter force transmitted from vehicular wheels through the steering member 8 or when the steering stub shaft 34 is rotated for steering adjustment, the torsion bar 17 is stressed torsionally, resulting in an angular displacement relative to the steering stub shaft. This is reflected in a corresponding angular displacement between the first and second bores 13 and 14 of the valve body 12 and the first and second spool valves 15 and 16. As apparent, the first and second spool valves 15 and 16 are displaced in opposite directions.

The first bore 13 is in communication with the smaller and larger area chambers 4 and 5 via ports formed through the valve body 12 and pressure lines 36 and 37. The second bore 14 is also in communication with the smaller and larger area chambers 4 and 5 via ports formed through the valve body and via the pressure lines 36a and 37a. Both of the first and second bores 13 and 14 are also connected to a working fluid reservoir 21 via drain passages 38 defined in the valve body, drain port 10 and the return passage 39.

The first spool valve 15 has a supply control land 20 for controlling flow rate of the working fluid into one end of the first bore 13 and thereby controlling the supply of working fluid from the first bore 13 to the smaller area chamber 4 and a drain control land 22 for controlling the rate of flow of working fluid from the larger area chamber 5 to the opposite end of the first bore 13. As apparent from FIG. 2, the opposite end of the first bore 13 is in communication with the drain passage 38 for draining the working fluid in the larger area chamber 5 to the reservoir 21 via the drain passage 38, the drain port 10 and the return passage 39. Similarly, the second spool valve 16 is provided with a supply control land 23 for controlling the rate of flow of working fluid to one end of the second bore 14 and thus controlling the working fluid supply to the larger area chamber 5. The second spool valve 16 is further provided with a drain control land 24 for controlling the rate of flow of working fluid from the smaller area chamber 4 to the other end of the second bore 14. The other end of the second bore 14 is connected to the reservoir 21 via the drain passage 38, the port 10 and the return passage 39.

The supply control land 20 opposes a land 25 projecting into the first bore 13 to form a supply control throttling orifice 27. The drain control land 22 similarly cooperates with a land 26 to form drain control throttling orifice 28. Similarly, the supply control land 23 works in conjunction with a land 29 around the inner periphery of the second bore 14 to form another supply control throttling orifice 31. The drain control land 24 cooperates with a land 30 in the second bore 14 to form a second drain control throttling orifice 32.

The first and second spool valves 15 and 16 are essentially identical in shape and have the same external diameter. The internal diameter of the supply control land 25 and the drain control land 26 of the first bore 13 is greater than that the internal diameter $\lambda_2$ of the supply control land 29 and drain control land 30 of the second bore 14. Therefore, the supply control throttling orifice 27 of the first bore 13 exerts less resistance to fluid flow into the smaller area chamber 4 than the supply control throttling orifice 31 of the second bore 14. Similarly, the drain control throttling orifice 28 exerts less resistance to fluid flow than the drain control throttling orifice 32 of the second bore 15.

It should be noted that the difference between the diameter $\lambda_1$ of the supply and drain control lands 25 and 26 and the diameter $\lambda_2$ of the supply and drain control lands 29 and 30 is selected to compensate for the hydraulic force differential between the smaller chamber 4 and the larger area chamber 5. Therefore, the difference in flow cross-section between the sets of throttling orifices 27, 28 and 31, 32 is inversely proportional to the difference between the effective area of the piston 6.

The operation of the preferred embodiment of the power assist device according to the invention will be described hereinbelow.

When the steering system is in its equilibrium position, the first and second spool valves 15 and 16 lie in their respective neutral positions as shown in FIG. 1. At the neutral positions of the first and second spool valves 15 and 16, the flow cross-section differential between the supply control throttling orifices 27 and 31 is just enough to compensate for the difference between the effective areas of the smaller and larger area chambers 4 and 5. In addition, the drain control throttling orifice 28 connected to the larger chamber 5 has a larger flow cross-section than the drain control throttling orifice 32 connected to the smaller chamber 4. This establishes a balance between the hydraulic forces exerted on opposite sides of the piston 6 so as to hold the piston in its neutral position. As a result, directional bias in the steering system due to the difference between the effective areas of the smaller area chamber 4 and the larger area chamber 5 can be successfully and satisfactorily prevented.

When the steering wheel is turned for a right-hand steering adjustment, causing clockwise rotation of the steering stub shaft 34, the first spool valve 15 shifts to the right through the first bore 13 to an extent corresponding to the steering adjustment magnitude. At the same time, the second spool valve 16 shifts to the left through the second bore 14 to an extent corresponding to the steering adjustment magnitude. As a result, the flow cross-sections of the supply control throttling orifice 27 and of the drain control throttling orifice 28 gradually increase according to rightward movement of the first spool valve 15, and conversely, the supply control throttling orifice 29 and the drain control throttling orifice 30 becomes more constricted as the second spool valve 16 moves to the left. Thus, the smaller area chamber 4 receives a greater supply of the working fluid due to the increase in the flow cross-section of the supply control throttling orifice 27. This increase in the fluid pressure in the smaller area chamber 4 is augmented by a decrease in the flow cross-section of the drain control throttling chamber 32 of the second bore 14, which is also in communication with the smaller area chamber 4. On the other hand, the larger area chamber 5 receives a reduced supply of working fluid due to the decrease in the flow cross-section of the supply control throttling orifice 31. In addition, the larger area chamber 5 loses more working fluid through the increased flow cross-section of the drain control throttling orifice 28 of the first bore. Therefore, the fluid pressure in the smaller chamber 4 exceeds that in the larger area chamber 5, resulting in leftward movement of the piston 6, reflected in a rightward toe change of the vehicular wheel. The axial offset of the piston 6 corresponds to the fluid force differential between the smaller area chamber and the larger area chamber. The fluid force differential between the smaller and larger area chambers 4 and 5 drops as the piston 6 shifts toward the larger area chamber 5 until the fluid forces balance at the piston position corresponding to the magnitude of the steering adjustment.

When the steering is adjusted to the left, resulting in counterclockwise rotation of the steering stub shaft 34, the first spool valve 15 shifts to the left to an extent corresponding to the steering adjustment. At the same time, the second spool valve 16 shifts to the right to an extent corresponding to the steering adjustment. As a result, the flow cross-section of the supply control throttling orifice 27 and of the drain control throttling orifice 28 of the first bore 13 gradually drops according to the leftward movement of the first spool valve 15. Conversely, the supply control throttling orifice 29 and the drain control throttling orifice 30 increase in flow cross-section as the second spool valve 16 moves to the right. The smaller area chamber 4 thus receives a smaller supply of working fluid due to the decrease in the flow cross-section of the supply control throttling orifice 27. This drop in the fluid pressure in the smaller chamber 4 is augmented by the increase in the flow cross-section of the drain control throttling chamber 32 of the second bore 14, which is in communication with the smaller area chamber 4. Conversely, the larger area chamber 5 receives an increased supply of working fluid as the flow cross-section of the supply control throttling orifice 31 increases, and, larger area chamber 5 loses less working fluid through the decreased flow cross-section of the drain control throttling orifice 28 of the first bore. Therefore, the fluid pressure in the larger chamber 5 exceeds that of the smaller area chamber 4 resulting in rightward movement of the piston 6 which is reflected in a leftward toe change of the vehicular wheel. The offset of the piston 6 corresponds to the fluid force differential between the smaller area chamber and the larger area chamber. The fluid force differential between the smaller and larger area chambers 4 and 5 drops as the piston 6 shifts toward the smaller area chamber 4 until these forces balance at the piston position corresponding to the magnitude of the steering adjustment.

During aforementioned steering operation, since the radius $R_1$ of the first spool valve 15 is smaller than the radius $R_2$ of the second spool valve 16, shifting magnitude of the first spool valve 15 relative to the first bore 13 is smaller than that of the second spool valve 16. Therefore, variation rate of the flow path areas of the throttling orifices 27 and 28 are smaller than that of the throttling orifice 31 and 32. This differentiates variation rate of the fluid pressure in the smaller and larger area chambers 4 and 5, which variation rate difference is enough to compensate difference of the effective areas of the smaller and larger area chambers. This compensate initial flow path difference between the orifices 27 and 31 and between the orifices 28 and 32 so that steering operation on either side can be performed at the same steering force.

According the shown embodiment, since the first and second spool valves 15 and 16 are identical in size and shape, it is impossible to erroneously assemble the hydraulic pressure control valve. This also allows quicker and more efficient assembly. Furthermore, by making all of the spool valve in the same size and shape, the spool valves can be produced more easily and cheaply.

In addition, given the above structure, it is unnecessary to mark the spool valves for assembly during production. This reduces the number of steps needed for spool valve production and so lowers the production cost.

Therefore, the present invention fulfills all of the objects and advantages sought therefor.

While the invention has been disclosed hereabove in terms of the preferred embodiment of the invention for the sake of disclosure, the invention should not be understood to be limited to the specific embodiment. It should be appreciated that the invention includes all possible embodiments and modifications of the shown embodiment which do not depart from the principles set out in the appended claims.

What is claimed is:

1. An automotive steering system having an unbalanced cylinder and a fluid control valve disposed in a hydraulic circuit connecting said cylinder to a fluid pressure source and to a fluid reservoir for controlling supply and drain of working fluid to said cylinder, comprising:
    said unbalanced cylinder having:
    an enclosed hollow cylinder;
    a piston disposed within the internal space of said cylinder so as to divide same into first and second working chambers; and
    a piston rod connected to said piston at one end and connected at the other end to a steering member which actuates re-alignment of vehicular wheels for steering, said piston rod extending through said first chamber and exiting said cylinder for connection to said steering member at said other end; said fluid control valve having:
    a valve housing connected to a manually operable steering stub shaft by means of a yielding structural member;
    a first and a second bore passing through said valve housing, which first and second bores are arranged substantially in parallel relationship to each other and radially oriented at different positions relative to a rotation axis of said steering stub shaft;
    a first and second spool valve disposed reciprocably within said first and second bore respectively, said first and second spool valves being connected to said steering stub shaft so as to be driven reciprocably in response to relative displacement between said valve housing and said steering stub shaft due to yielding of said yielding member, and said first and second spool valves having identical structures, and said first and second spool valves are so associated with said first and second bores as to differentiate magnitude of shifting relative to said first and second bores from each other;
    first and second means defining a first supply orifice and a first drain orifice between said first spool valve and the inner periphery of said first bore, the flow cross-section of said first supply orifice varying with the position of the first spool valve for control of the supply of working fluid to said first working chamber in said cylinder, and the flow cross-section of said first drain orifice varying with the position of said first spool valve for control of drainage of working fluid from said second working chamber, and a second supply orifice and a second drain orifice between said second spool valve and the inner periphery of said second bore, the flow cross-section of said second supply orifice varying with the position of said second spool valve for control of the working fluid supply to said second working chamber of said cylinder, and the flow cross-section of said second drain orifice varying with the position of said second spool valve for control of drainage of working fluid from said first chamber of said cylinder, and said flow cross-section of said first supply orifice and said first drain orifice being greater than that of the corresponding second supply orifice and second drain orifice.

2. The steering system as set forth in claim 1, wherein the difference of shifting magnitude of said first and second spool valve is determined so as to compensate flow path difference between said first supply orifice and said second supply orifice and between said first drain orifice and said second drain orifice.

3. The steering system as set forth in claim 2, wherein said first means comprises first and second lands on said spool valve and third and fourth lands on the inner periphery of said first bore, said first land opposing said third land so as to define said first supply orifice therebetween and said second land opposing said fourth land so as to define therebetween said first drain orifice, and said second means comprises fifth and sixth lands on said second spool valve and seventh and eighth lands on the inner periphery of said second bore, said fifth land opposing said seventh land so as to define said second supply orifice therebetween and said sixth land opposing said eighth land so as to define said second drain orifice therebetween.

4. The steering system as set forth in claim 3, wherein the flow cross-sections of said first supply orifice and said first drain orifice are larger than those of said second supply orifice and said second drain orifice to such an extent that the increase in fluid flow rate through said first supply orifice to said first bore relative to that through said second supply control section to said second working chamber, and the decrease in fluid flow rate though said second drain orifice from said first chamber relative to that through said first drain orifice from said second working chamber compensate for the difference between the effective areas of said first and second working chambers due to the presence of said piston rod.

5. The steering system as set forth in claim 4, wherein said third and fourth lands are larger in diameter than said first and second lands so as to define said first supply orifice and said first drain orifice, and said seventh and eighth lands are larger in diameter than said fifth and sixth lands so as to define said second supply orifice and said second drain orifice, said third and fourth lands being of greater diameter than said seventh and eighth lands.

6. A fluid flow control valve device for a power assist system for an automotive vehicle which has a hydraulically actuated unbalanced cylinder enclosing a piston connected to a steering member which actuates realignment of vehicular wheels for steering, which piston divides the internal space of the cylinder into first and second working chambers, comprising:

a valve housing connected to a manually operable steering stub shaft by means of a yielding structural member;

a first and second bore passing through said valve housing, which first and second bores are radially located at different positions relative to a rotation axis of said steering stub shaft;

a first and second spool valve disposed reciprocably within said first and second bore respectively for shifting substantially along the axis of respectively corresponding first and second bores, said first and second spool valves being connected to said steering stub shaft so as to be driven reciprocably in response to relative displacement between said valve housing and said steering stub shaft due to yielding of said yielding member, and said first and second spool valves having the identical structures to each other, and said first and second spool valves are so associated with said steering stub shaft for reciprocably shifting along said first and second bores as to differentiate magnitude of shifting relative to said first and second bores from each other with respect to angular displacement of said steering stub shaft;

first and second means defining a first supply orifice and a first drain orifice between said first spool valve and the inner periphery of said first bore, the flow cross-section of said first supply orifice varying with the position of the first spool valve for control of the supply of working fluid to said first working chamber in said cylinder, and the flow cross-section of said first drain orifice varying with the position of said first spool valve for control of drainage of working fluid from said second working chamber, and a second supply orifice and a second drain orifice between said second spool valve and the inner periphery of said second bore, the flow cross-section of said second supply orifice varying with the position of said second spool rom said first chamber of said cylinder, and said flow cross-section of said first supply orifice and said first drain orifice being greater than that of the corresponding second supply orifice and second drain orifice.

7. The steering system as set forth in claim 6, wherein the difference of shifting magnitude of said first and second spool valve is determined so as to compensate flow path difference between said first supply orifice and said second supply orifice and between said first drain orifice and said second drain orifice.

8. The fluid flow control valve as set forth in claim 7, wherein said first means comprises first and second lands on said spool valve and third and fourth lands on the inner periphery of said first bore, and first land opposing said third land so as to define said first supply orifice therebetween and said second land opposing said fourth land so as to define therebetween said first drain orifice, and said second means comprises fifth and sixth lands on said second spool valve and seventh and eighth lands on the inner periphery of said second bore, said fifth land opposing said seventh land so as to define said second supply orifice therebetween and said sixth land opposing said eighth land so as to define said second drain orifice therebetween.

9. The fluid flow control valve as set forth in claim 8, wherein the flow cross-sections of said first supply orifice and said first drain orifice are larger than those of said second supply orifice and said second drain orifice to such an extent that the increase in fluid flow rate through said first supply orifice to said first bore relative to that through said second supply control section to said second working chamber, and the decrease in fluid flow rate though said second drain orifice from said first chamber relative to that through said first drain orifice from said second working chamber compensate for the difference between the effective areas of said first and second working chambers due to the presence of said piston rod.

10. The fluid flow control valve as set forth in claim 9, wherein said third and fourth lands are larger in diameter than said first and second lands so as to define said first supply orifice and said first drain orifice, and said seventh and eighth lands are larger in diameter than said fifth and sixth lands so as to define said second supply orifice and said second drain orifice, said third and fourth lands being of greater diameter than said seventh and eighth lands.

11. An automotive steering system with a hydraulic power assist device comprising;

a steering member connected to vehicular wheels for adjusting the orientation of the wheels for steering and transversely movable according to manual steering adjustments;

a hollow hydraulic cylinder having first and second inlet ports and first and second drain ports;

a piston disposed within said hydraulic cylinder and dividing the internal space of said cylinder into first and second chambers, said first chamber being in communication with said first inlet port and said first drain port, and said second chamber being in communication with said second inlet port and said second drain port, said piston being connected to said steering member for transverse movement therewith via a piston rod extending through said first chamber;

a power-assist valve housing with a third inlet port connected to a working fluid source, first and second outlet ports respectively connected to said first and second inlet ports of said cylinder, and third and fourth drain ports respectively connected to said first and second drain ports of said cylinder and a fifth drain port connected to a fluid reservoir for returning working fluid thereto, said housing also having first and second bores passing therethrough, said first bore being in communication with said first outlet port and said fourth drain port and said second bore being in communication with said second outlet port and said third drain port, said first bore being radially oriented at a position of greater distance from a rotation axis of a steering shaft which is rotatable manually in opposite directions, than a distance between said rotation axis of said steering shaft to said second bore;

first and a second spool valves respectively disposed within said first and second bores and associated with said steering shaft rotatable manually in opposite directions, said first and second spool valves being of identical construction, said first and second valves being associated with an actuation means extending along said center axis of said valve housing to be transmitted steering force for causing shifting relative to corresponding one of first and second bores during steering operation, said first spool valve defining a first variable supply control path in conjunction with the inner periphery of said first bore establishing fluid communication between said third inlet port and said first outlet port, and a variable first drain control path in conjunction with said inner periphery of said first bore establishing fluid communication between said fifth drain port and said fourth drain port, and said second spool valve defining in conjunction with the inner periphery of said second bore a second supply control path establishing fluid communication between said third inlet port and said second outlet port and a second drain path establishing said fluid communication between said fifth drain port and said third drain port, said second control paths having smaller flow cross-section than said first control paths, the flow cross-sections of all of said control paths varying with rotation of said steering shaft.

* * * * *

UNITED STATES PATENT AND TRADEMARK OFFICE
CERTIFICATE OF CORRECTION

PATENT NO. : 4,696,198

DATED : September 29, 1987

INVENTOR(S) : SHINICHI KOMATSU

It is certified that error appears in the above-identified patent and that said Letters Patent is hereby corrected as shown below:

Column 12, line 17, Claim 6, delete "rom".

In Column 12, claim 6, line 17, after "spool" insert
--valve for control of the working fluid supply to said second
working chamber of said cylinder, and the flow cross-section
of said second drain orifice varying with the position
of said second spool valve for control of drainage of working
fluid from--.

In Column 12, claim 8, line 32, delete "and" and
insert --said--.

Signed and Sealed this

Seventh Day of June, 1988

Attest:

DONALD J. QUIGG

*Attesting Officer*    *Commissioner of Patents and Trademarks*